Oct. 30, 1928.
A. GRILLI
1,689,825
TIRE AND LUGGAGE CARRIER
Filed Jan. 30, 1925
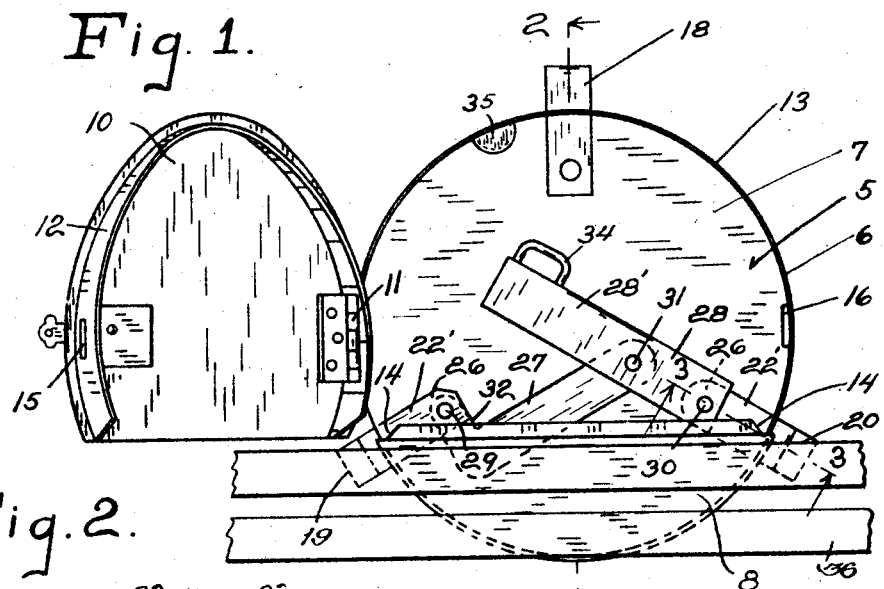
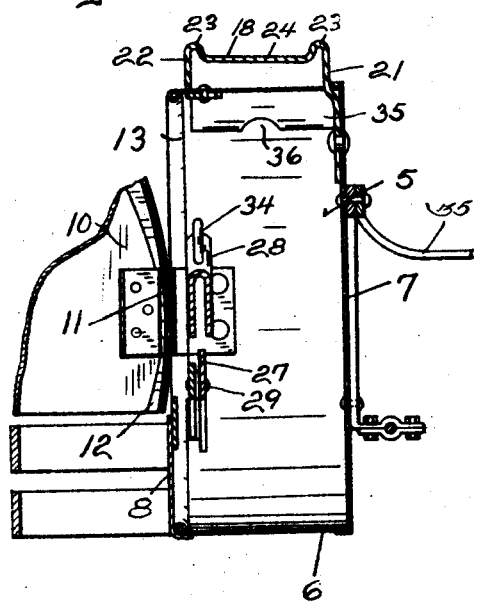
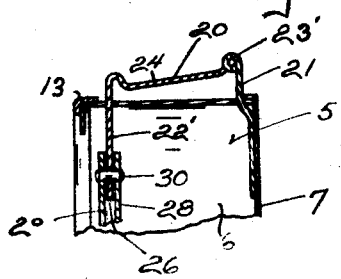
INVENTOR.
Angelo Grilli
BY
Erwin, Wheeler & Woolard
ATTORNEYS.

Patented Oct. 30, 1928.

1,689,825

UNITED STATES PATENT OFFICE.

ANGELO GRILLI, OF MILWAUKEE, WISCONSIN, ASSIGNOR OF ONE-HALF TO DAN LIVIERI, OF MILWAUKEE, WISCONSIN.

TIRE AND LUGGAGE CARRIER.

Application filed January 30, 1925. Serial No. 5,721.

This invention relates to improvements in spare tire and luggage carriers. It is the object of the invention to provide a novel and improved case having a door which may be locked, and formed exteriorly to support a tire and interiorly to provide mechanism for actuating the tire support, the said mechanism being inaccessible when the door is locked. Thereby a single lock and key serves to secure luggage housed within the support and also serves to secure the tire against theft.

More particularly stated, it is the object of this invention to provide a drum-like casing having a door whereby luggage may be introduced therein and provided interiorly with a toggle-link mechanism and exteriorly with adjustable rim engaging elements controlled as to movement by the toggle-link mechanism within the casing. It is a further object of this invention to provide a construction such that it may be used upon a vehicle having a rear bumper and when so used the door of the luggage compartment may be opened without interfering with such a bumper. It is a further object of this invention to provide a construction such that the nipple through which the vehicle tire is filled with air may be housed and protected against tampering and at the same time will be accessible to authorized manipulation without removal of the spare rim and tire from the support.

In the drawings:

Figure 1 is a rear elevation of a device embodying this invention.

Figure 2 is a section taken on line 2—2 of Figure 1.

Figure 3 is a detail section taken on line 3—3 of Figure 1.

Like parts are identified by the same reference characters throughout the several views.

In the simple form of the invention which is illustrated in the accompanying drawings the drum-like receptacle or casing is designated in its entirety by reference character 5. It includes an annular wall 6, a disk-like front wall 7, and a segmental rear wall 8. In referring to the front and rear walls of this device, attention is called to the fact that they are disclosed as if the device were mounted in its normal position at the rear of a motor vehicle with the segmental wall downward as indicated in Figure 1.

The major portion of the rear side of the receptacle 5 may be opened for the insertion or removal of luggage therefrom. To close this opening for the purpose of securing the contents of the drum or receptacle 5 I provide a door 10 hinged at 11 to one side of the annular wall 6 of the drum. This door is preferably provided with an inwardly extending flange 12 fitting closely within the beaded margin 13 of the drum. The segmental wall 8 overlaps interiorly the closed door 10 and is notched at 14 to receive the ends of the arcuate flange 11 of the door. A suitable locking device 15 is applied to the door and may engage the keeper 16 on the casing to hold the door closed.

Projecting radially outwardly from the housing 5 are a plurality of rim supports 18, 19, and 20. These supports are saddle-shaped being provided with legs and a depressed central portion to receive the rim. The support 18 has its leg 21 riveted or welded to the rear wall of the casing and its leg 22 riveted or welded to the annular wall 6 thereof. It is bent back upon itself at 23 to provide the saddle or depressed central portion 24, the transverse dimension of which corresponds substantially to the transverse dimension of the rim to be accommodated. The integrally formed upwardly projecting bends 23 engage the sides of the rim to retain it in position.

Rim supports 19 and 20 differ from rim support 18 in that they are preferably so constructed as to be adjustable to release or engage a rim. The support shown at 18 will be noted to be integral and comparatively rigid so far as its mounting is concerned. In Figure 3 I have illustrated support 20 which may be taken as typical of support 19 also. In this construction the leg 22' of the support corresponds to leg 22 already described but is not riveted or otherwise secured directly to the casing 5, instead it passes substantially radially through the wall of said casing and has an apertured extremity 26.

The extremities 26 of members 19 and 20 are interconnected by toggle links 27 and 28 which are pivotally connected at 29 and 30 with the respective ends 26 of such members and are pivotally connected to each other at 31. Link 27 will be noted to be provided with an offset at 32 and link 28 is preferably made in the form of a channel to receive a portion of link 27. A handle 34 provides for the convenient manipulation of the device. Link 28 is extended at 28' in the channel form previously referred to and the handle 34 is located at the end of this extension so that the operator will have considerable leverage with which to expand or contract the rim carrying mechanism. Furthermore the channel so operates to receive a portion of link 27 as to limit the expanding movement of the toggle and prevents injury to the operator's hands which might result if the extension lever 28' and link 27 could be forced past each other.

It will be obvious that when the toggle device is in the position illustrated in Figure 1 the legs 22' of rim supports 19 and 20 will be drawn radially toward the center of the housing or drum 5. This results in a contraction of the rim supporting mechanism taken as a whole, the bends 23 located nearest to the rear face of the drum being adjusted centrally so that the rim positioned upon saddle portion 24 may be slipped thereover. Obviously it is unnecessary to adjust rim support 18 inasmuch as after the rim has slipped over the saddle portions of rim supports 19 and 20 it may readily be lifted from rim support 18.

A certain amount of resilience will be necessary in the rim supports to permit them to move in the manner described. Rather than depend altogether upon the resilience of these supports, however, I prefer to provide on supports 19 and 20 a hinged connection at 23' between the saddle portions 24 of such support and the forward leg portions 21 thereof. A comparatively slight resilience will take care of all relative movement occurring in the bend 23 as shown in Figure 3. Obviously this bend may likewise be provided with a hinge identical to that shown at 23' if desired.

I prefer to aperture the drum upon one side or the other of the rigid support 18 and to provide interiorly of the drum a semi-cylindrical closure 35 into which the nipple of the spare tire may project. An aperture 36 permits access to this nipple from the interior of drum 5 when the door 10 is open. Thus by opening the door it is possible to fill the spare tire with air although the nipple is inaccessible from the exterior of the drum and is secure from unauthorized tampering.

It will be apparent from the foregoing description that not only is the drum available for the storage of luggage but it also serves to house the nipple of the spare tire mounted thereon and to protect the adjusting mechanism by means of which the spare tire support is expanded or contracted to hold or release the spare rim. It will further be noted that the drum or housing has a fixed capacity due to the fact that the adjustable portions of the rim support move independently of any portion of the drum itself. In the drawings the carrier is shown as supported by means of a conventional racket construction 35 behind the usual bumper bars 36. It is further to be noted that the segmental wall 8 terminates at such a height that the door complementary thereto will clear the bumper bars which encircle the rear of my improved tire and luggage carrier and although the opening in the drum is thus reduced to a considerably lesser size than would be the case if the entire rear face of the drum served as a door, nevertheless the toggle mechanism which actuates the rim engaging supports is so disposed as to be conveniently accessible through said door and to be out of the way when the supports are expanded to rim engaging position so that it does not interfere with the introduction or removal of luggage.

I claim:

1. In a device of the character described, the combination with a drum having a relatively fixed rim engaging support projecting from its periphery, of a second rim engaging support projecting from the periphery of said drum and including a saddle and a pair of legs, one of said legs being connected with the drum and the other of said legs being radially adjustable with respect to said drum whereby to move one side of said saddle to and from a rim engaging position.

2. In a device of the character described, the combination with a drum having a relatively fixed rim engaging support projecting from its periphery, of a second rim engaging support projecting from the periphery of said drum and including a saddle and a pair of legs, one of said legs being connected with the drum and the other of said legs being radially adjustable with respect to said drum whereby to move one side of said saddle to and from a rim engaging position, mechanism within said drum operatively connected with said adjustable leg and adapted to produce movement thereof to and from said position.

3. In a device of the character described, the combination with a drum having a relatively fixed rim engaging support projecting from its periphery, of a second rim engaging support projecting from the periphery of said drum and including a saddle and a pair of legs, one of said legs being connected with the drum and the other of said legs being radially adjustable with respect to said drum whereby to move one side of said saddle to and from a rim engaging position, mechanism within said drum operatively connected with said adjustable leg and adapted to produce movement thereof to and from said position, a third rim engaging support similar to the second as above characterized and having its adjustable leg connected with said mechanism to receive movement therefrom simultaneously with the reception of movement by the leg of said second mentioned support.

4. In a device of the character described, the combination with a drum having a relatively fixed rim engaging support projecting from its periphery, of a second rim engaging support projecting from the periphery of said drum and including a saddle and a pair of legs, one of said legs being connected with the drum and the other of said legs being radially adjustable with respect to said drum whereby to move one side of said saddle to and from a rim engaging position, mechanism within said drum operatively connected with said adjustable leg and adapted to produce movement thereof to and from said position, a third rim engaging support similar to the second as above characterized and having its adjustable leg connected with said mechanism to receive movement therefrom simultaneously with the reception of movement by the leg of said second mentioned support, said mechanism comprising toggle links in pivotal connection with each other and with the adjustable legs of said second and third supports.

5. In a device of the character described and adapted to be mounted at the rear of a vehicle provided with a bumper and within the bumper, the combination with a drum having a disk-like front wall, a peripheral wall connected therewith, and a relatively fixed segmental rear wall having a substantially horizontal upper margin at a greater height than said bumper, of a door hingedly connected with the peripheral wall of said drum and complementary to the segmental wall of said drum whereby to clear a bumper adjacent thereto together with rim engaging means supported from said drum and including radially adjustable portions movable between rim engaging and rim releasing positions, and manually operable toggle mechanism connected with a plurality of said portions and disposed interiorly of said drum in a position accessible when said door is opened, said toggle mechanism being adapted for the simultaneous movement to rim releasing positions of the portions with which it is connected.

ANGELO GRILLI.